United States Patent [19]

Priem et al.

[11] Patent Number: 5,287,487
[45] Date of Patent: Feb. 15, 1994

[54] PREDICTIVE CACHING METHOD AND APPARATUS FOR GENERATING A PREDICTED ADDRESS FOR A FRAME BUFFER

[75] Inventors: Curtis Priem, Fremont; Chris Malachowsky, Santa Clara; Robert Rocchetti, Cupertino; David Rosenthal, Palo Alto, all of Calif.

[73] Assignee: Sun Microsystems, Inc., Mountain View, Calif.

[21] Appl. No.: 74,703

[22] Filed: Jun. 9, 1993

Related U.S. Application Data

[63] Continuation of Ser. No. 576,672, Aug. 31, 1990.

[51] Int. Cl.$^5$ .................. G06F 12/02; G06F 13/00
[52] U.S. Cl. .................. 395/425; 395/400; 395/800; 364/DIG. 1; 364/256.8; 364/263.1; 364/DIG. 2; 364/939.7; 364/955; 364/948
[58] Field of Search .............. 395/400, 800, 425, 375

[56] References Cited

U.S. PATENT DOCUMENTS

| | | | |
|---|---|---|---|
| 3,898,624 | 8/1975 | Tobias | 395/425 |
| 4,888,679 | 12/1989 | Fossum et al. | 395/800 |
| 4,980,823 | 12/1990 | Liu | 395/425 |
| 5,056,044 | 10/1991 | Frederickson et al. | 364/521 |
| 5,146,578 | 9/1992 | Zangenehpour | 395/425 |

FOREIGN PATENT DOCUMENTS

| | | |
|---|---|---|
| 0097256 | 5/1983 | European Pat. Off. |
| 0109309 | 11/1983 | European Pat. Off. |
| 0173981 | 8/1985 | European Pat. Off. |
| 0296430 | 6/1988 | European Pat. Off. |
| 1515376 | 7/1975 | United Kingdom |

*Primary Examiner*—Parshotam S. Lall
*Assistant Examiner*—Timothy L. Philipp
*Attorney, Agent, or Firm*—Blakely Sokoloff Taylor & Zafman

[57] ABSTRACT

A predictive caching system for use in computer system having at least one portion of memory in which information is stored for retrieval, a general cache used to speed the operation of accessing such memory, and a processor for controlling the access of the memory comprising apparatus for discerning a pattern of access of the memory, apparatus operating in response to the pattern determined by the apparatus for discerning a pattern of access of the memory for determining a next address which will probably accessed in such memory if the pattern discerned continues, and apparatus for storing the information at the next address determined prior to the next access of the memory whereby the information at the next address is available without the need to access the memory.

5 Claims, 5 Drawing Sheets

RRR patterns: Pred. Address = $\Delta12 + A_{n-1}$
WWW patterns: Pred. Address = $\Delta12 + A_{n-1}$
RWRW patterns: Pred. Address = $\Delta13 + A_{n-2}$
$A_n$ = 1st R of $R_xR_yW_y$ patterns: Pred. Address = $\Delta13 + A_n$
$A_n$ = 2nd R of $R_xR_yW_y$ patterns: Pred. Address = $\Delta13 + A_n$
$A_n$ = W of $R_xR_yW_y$ patterns: No prediction necessary

PREDICTIVE CACHING METHOD AND APPARATUS FOR GENERATING A PREDICTED ADDRESS FOR A FRAME BUFFER

This is a file wrapper continuation application of U.S. patent application Ser. No. 07/576,672, filed on Aug. 31, 1990, entitled Method and Apparatus for Predictive Caching.

BACKGROUND OF THE INVENTION

1. Field of the Invention

This invention relates to caching arrangements used in computer systems and, more particularly, to methods and apparatus for caching data expected to be used by such systems.

2. History of the Prior Art:

In computer systems, the access of main memory to retrieve information often takes a substantial portion of the operational time. This occurs for various reasons. First, main memory is random access memory which is often sufficiently large that its cost is kept within bounds by using relatively slow memory devices. Second, in systems using virtual memory arrangements to increase the addressable space without increasing the physical size of the main memory, it is necessary to address information in both main memory and secondary memory such as magnetic disk storage by means of memory management arrangements which utilize look-up tables to translate virtual addresses to physical addresses. This indirect addressing requires a substantial amount of time.

For this reason, the use of cache memories to increase system speed has become prevalent in more advanced systems. A cache memory makes use of a relatively small amount of fast (and therefore expensive) random access memory in which recently used instructions, data, or both are stored as they are used by a processor. Such information is then available in the cache memory so that it may be more rapidly accessed by the associated processor when next required. The basic theory of caching is that, in general, information which has been recently used is more likely to be used sooner than is other information. The cache memory is often both physically faster than the random access memory used for main memory and is arranged so that it may be addressed more rapidly than may main memory by obviating the need for the look-up operation to determine physical addresses. Such caching arrangements have operated to greatly increase the speed of operation of computer systems for certain types of information.

Caching works well in situations where the same information is repeatedly utilized in carrying out an operation. An example of such a use is found in executing an instruction including a looping operation. Caching does not usually work well in situations in which entirely new information is used in each step of the operation. For example, in scrolling down the screen of a computer output display which shows approximately one thousand pixels of eight bit bit-mapped color information in each of the horizontal and vertical directions, approximately one megabyte of data is traversed. A typical cache memory may hold sixty-four kilobytes of information. A scrolling operation essentially reads information in a first scan line and writes that information to the next line below or above. When the cache is used to accomplish scrolling, it can hold only a few lines from such a frame buffer. Thus, except for the first few lines, none of the information which has been placed in the cache memory is reused so no increase in speed is accomplished. Moreover, since for the greatest part of the scrolling operation the processor is continually filling the cache memory with new information, the operation takes much longer using a cache memory than it would without a cache memory. In such a cache fill operation, the processor must first look to the cache memory for the information, determine that the information is missing in the cache memory, go to the look-up tables for the physical address of the information, access the information to be used in main memory, store that information in the cache memory replacing other information, and finally use the information. Such an operation must repeat continuously during a scrolling operation so that the fact that the operation takes longer than a simple access of main memory should not be surprising.

One method of increasing the speed of operation of a computer is to design the processor to handle instructions which are pipelined so that one instruction is executed during each clock cycle of operation. While the early pipelined computer systems using caching demonstrated a loss of approximately four instructions for each cache memory miss, the faster systems being designed at present will have a loss of as much as sixty-four instruction times for each cache miss. This is a very large delay in a fast computer system. For this reason, many systems now include methods for disabling the caching operation in situations in which it may delay the operation of the system. Although such methods eliminate the delays caused by the caching of certain information, they do not speed the handling of that information in any other way.

SUMMARY OF THE INVENTION

It is, therefore, an object of the present invention to increase the speed of operation of a computer system.

It is another more specific object of the present invention to increase the speed of operation of a computer system by providing circuitry for predicting which information will be next used in a computer operation and placing that expected information in a small cache for use by the system.

These and other objects of the present invention are realized in a computer system which comprises, in addition to the typical system components, a relatively small cache memory closely associated with a particular portion of system memory, means for discerning patterns of data accessed in the closely associated memory, and means for filling the cache memory based on predictions from such discerned patterns.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
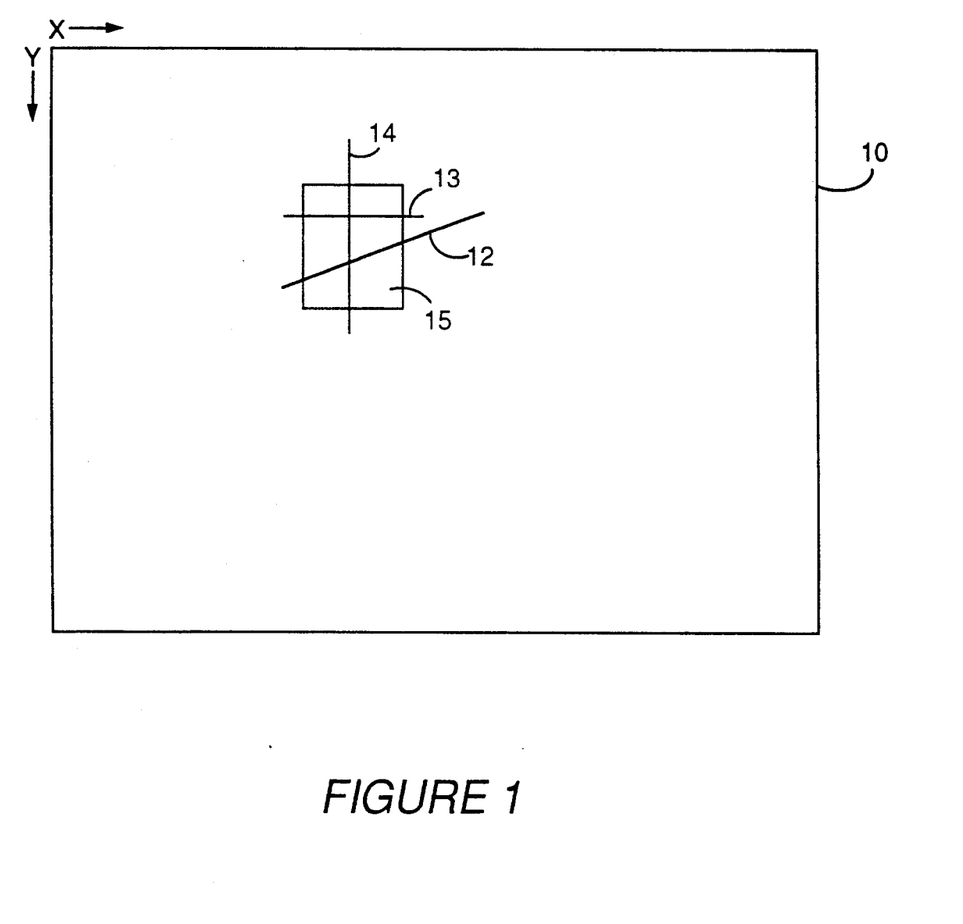
FIG. 1 is an illustration of a frame buffer showing various elements which may be stored therein for display.

Referring now to FIG. 1, there is shown a diagram of a frame buffer 10 used in a typical work station. The frame buffer 10 may be considered for the purpose of this specification to be capable of holding data for display on a bit-mapped computer output display having approximately one thousand pixels along each scan line in a horizontal direction and approximately one thousand scan lines in a vertical direction. In general, the exemplary frame buffer 10 may be considered to hold eight bits of information for each pixel so that it may hold in total approximately one megabyte of data for screen display.

In general, for the purpose of this discussion, each pixel of information may be considered to be stored in a position in the frame buffer 10 which is essentially the same position as that in which it will appear on the output display. Although this is not necessary true, it is at least a correct logical statement and probably makes understanding somewhat easier. Therefore, those elements which are described by the information stored in the frame buffer 10 are illustrated as stored in positions in the frame buffer 10 which are the positions in which they would be displayed on the computer output display. For example, the vectors or line segments 12, 13, and 14 illustrated in FIG. 1 are stored in pixel positions (whether logical or physical) of the frame buffer 10 which are the positions in which they appear on the display screen.

Figure 2:
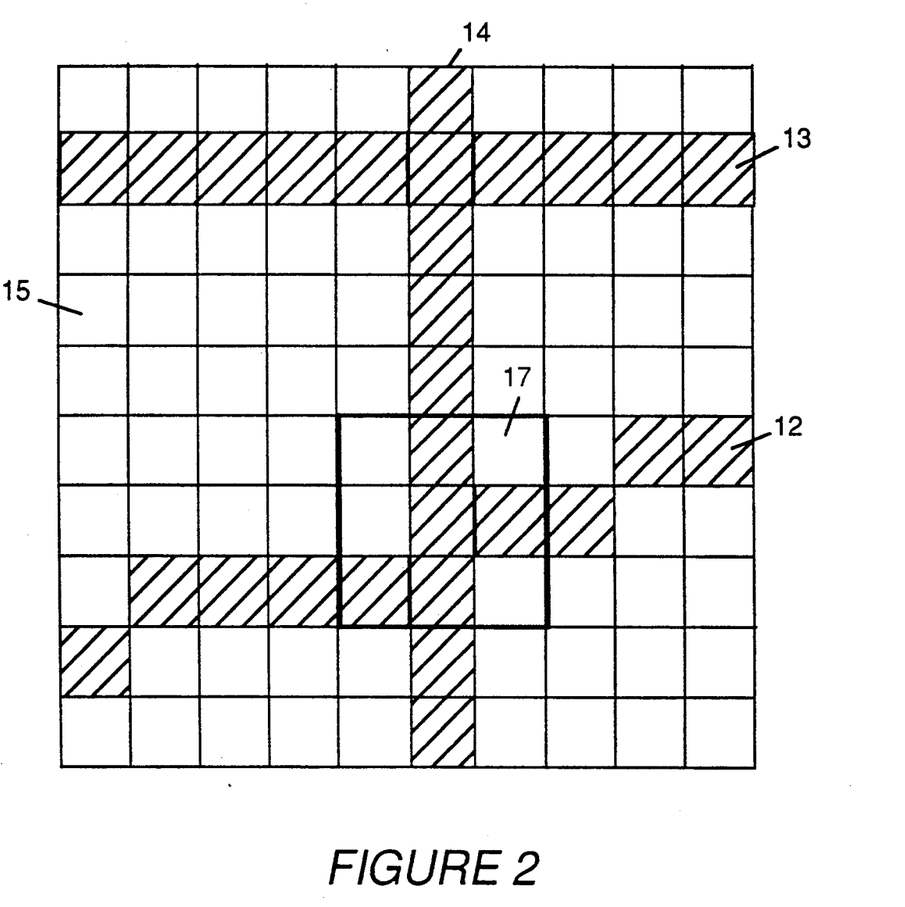
FIG. 2 is an enlargement of a portion of the frame buffer illustrated in FIG. 1 showing the various elements which may be stored therein for display.

FIG. 2 illustrates a small (ten by ten pixels) enlarged portion 15 of the frame buffer 10 illustrated in FIG. 1 containing portions of each of the lines 12, 13, and 14 shown in FIG. 1. That portion of the line 13 shown in FIG. 2 is described by ten pixels stored serially adjacent one another on a single horizontal row of the frame buffer. This information will appear on a single scan line of the output display. That portion of the line 14 shown in FIG. 2 is described by ten pixels stored adjacent above and below one another in a single column of a frame buffer which pixels will be described on ten adjacent scan lines of the output display. That portion of the line 12 shown in FIG. 2 is described by pixels stored on a number of adjacent horizontal rows of the frame buffer to be shown on a number of adjacent scan lines of the output display, the pixels on each scan line lying serially adjacent one another.

The three line segments 12, 13, and 14 are typical of the various elements which are placed in a frame buffer for display on a bit-mapped output display of a computer system. Such elements may be used to construct larger figures of almost any shape. Reviewing the three different line segments 12, 13, and 14, those skilled in the art will recognize that when the line 13 is stored in the frame buffer, the pixels lie in the same row with linear addresses immediately adjacent one another. It is usual for a system in filling a general system cache memory to write not only the specific information accessed but also information adjacent to that accessed to the cache memory because such information is likely to be accessed quite soon. Thus, once any position on the line 13 has been accessed, the information defining the pixels adjacent to the accessed position on that line will usually be held within a typical cache associated with a processor so that those pixels may also be accessed without occasioning other than a start up cache miss.

On the other hand, the line 14 is described by pixels each of which has an address which has the same X value but is one row down from the last row accessed. Depending on the size of the cache and operation being performed, it is typical that only the pixels immediately adjacent each other on the same row will be held within the cache after a first access of a position on the line 14 when accomplishing an update of the display. Consequently, when the line 14 is accessed, a cache miss will probably occur with each pixel of the line 14 in reading the cache memory to write the line 14 to the output display. Finally, the pixels describing the line 12 have addresses immediately adjacent each other on individual rows but offset in the Y direction by one pixel from row to row. As with the line 14, only pixels of line 12 in the same row as an accessed pixel will usually reside within the typical cache. Thus, when the line segment 12 is written to the output display, a cache miss will occur between each scan line, three misses in total for the portion of the line segment 12 illustrated in FIG. 2.

However, when either reading or writing any of the lines shown in FIG. 2, the next pixel to be read or written will be a pixel having an address within one pixel of the last described pixel in either the X or the Y direction (or both) within the frame buffer. Superimposed on FIG. 2 is a box 17 illustrating such a group of nine adjacent pixels stored in a frame buffer. If the pixel presently being accessed to describe a line segment on the display is considered to lie in the center position of the nine pixels in the box 17, then the next pixel to be accessed will lie in one of the other eight pixel positions within that box 17 so long as the same line segment is being described. This is true for both read and write accesses of the frame buffer where any connected line segment is involved.

Consequently, for each of the read and write operations in a frame buffer involving a line segment, the address of a next pixel may be accurately predicted so long as a line segment of any shape is being described. Only when a line segment begins or terminates is the position of the next pixel not accurately predictable. Since the next pixel address in describing a line may be accurately predicted, a small cache may be used to store the data at the addresses of the next possible pixels for describing any line segment. For the two operations described (read and write), such a cache need only hold the data for the position presently being accessed and the eight pixel positions surrounding the present position to assure that a cache miss will not occur on the next access.

Although the size of such a cache is trivial (nine memory storage locations), the increase in speed produced is not. For example, in reading the pixels for the line 14 from the frame buffer so that they may be written to the output display when using a normal cache associated with the central processing unit, it can be expected that a cache miss will occur for each pixel. If a line segment to be described is ten pixels long, then it can be expected that delays in a pipelined architecture of up to sixty-four instruction times may occur ten times in describing such a line. Using the small cache herein described, however, a cache miss will probably occur only on the first pixel of the line 14 thereby speeding the operation by a total of sixty-four instructions times multiplied by nine. This is a great deal of acceleration for a very small cache to accomplish. It has been determined through statistical studies that read accesses are approximately fifty percent of the frame buffer operations. Some operations may be accelerated substantially by the use of a cache memory as herein described because the full access of each pixel position in the frame buffer may be replaced by the access of the more-rapidly operating cache memory. This result assumes that the cache can remain filled by transparently performing frame buffer accesses between host CPU frame buffer access requests.

To generalize, there are three types of frame buffer raster operations which may take place. These are operations which may be classified as zero, one, and two operand raster operations. A zero operand raster operation is a write only operation; an example is clearing an area of the screen. Since there is no need to know what was held in the particular pixels of the frame buffer, no cache is needed for the next operation. However, a small cache can speed up the operation on write accesses by essentially providing a level of write buffering. The cache can accept the write access, capture the relevant data, and release the host. The host assumes the write has taken place and continues with other operations. In the meantime the cache actually writes the data to the frame buffer. An example of a one operand operation is an invert command in which a pixel is changed from black to white. Such an operation requires a read and a write for each pixel; for a line segment, sufficient storage is provided by the small cache described above for such an operation. A two operand operation, on the other hand, may be exemplified by a copy operation such as a vertical scroll of the display. In such an operation, the information at one pixel is read in a first location and written into a second location. For any line segment, a cache in accordance with this invention must be large enough to store information regarding the nine addresses described for the location to be read plus another nine addresses storing the pixels to be written. That is, a pixel is read and written to a new address a directed distance away, for example, one scan line directly below. Although accessing the first address to be read will cause a cache miss, the second address to be written is known from the directed distance given by the instruction. Moreover, the next address to be read will be within the eight pixels surrounding the first accessed read position while the next address to be written lies at the same directed distance from the second pixel read as did the first pixel written from the first pixel read. Thus, presuming these addresses are cached, sufficient information is available to determine each position; and no further cache misses will occur until the copying of the line segment ends.

Thus it is clear that the small caching arrangement proposed by this invention offers substantial increases in speed for the operation of frame buffers in all but the simplest zero operand operations.

Figure 3:
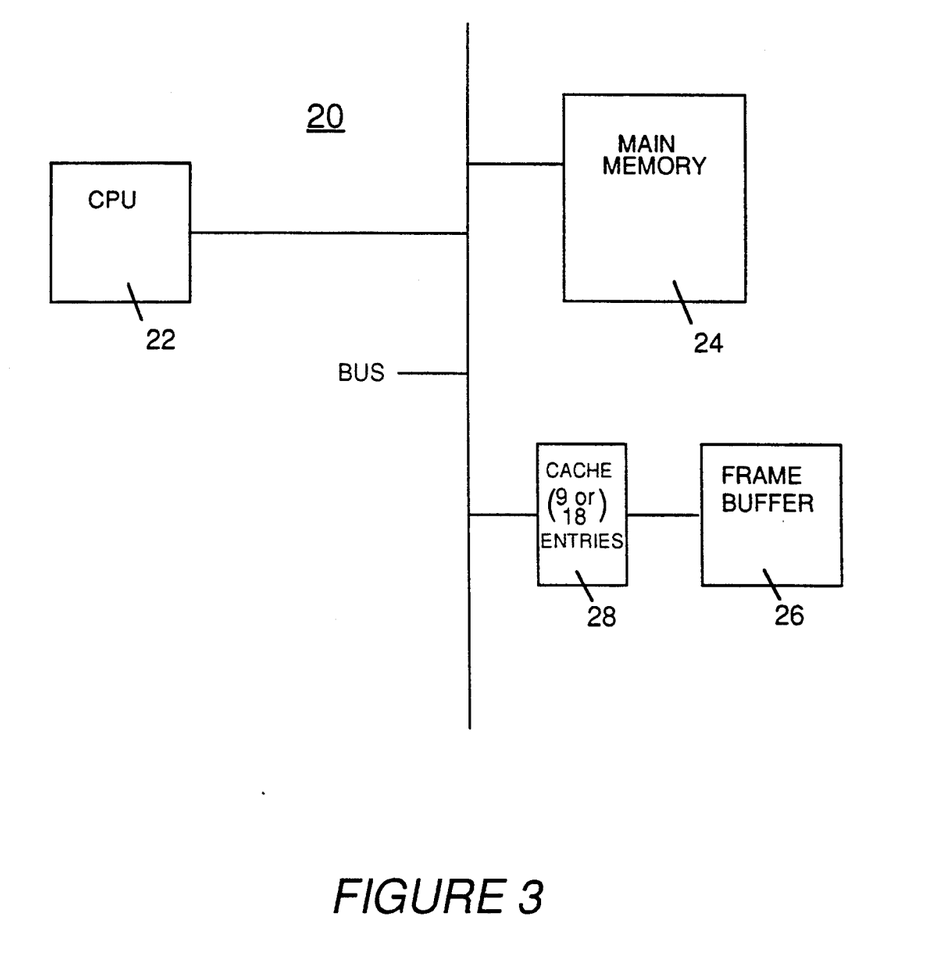
FIG. 3 is a block diagram illustrating a circuit for accomplishing caching in accordance with the invention.

The construction in hardware of such an arrangement requires only sufficient cache memory to record the data and addresses in at least the eighteen individual positions including the initial position from which a pixel may be read, the eight pixels surrounding the initial position, the first position to which a pixel is to be copied, and the eight pixels surrounding that first position. A circuit arrangement such as described is illustrated in block diagram form in FIG. 3. The arrangement illustrates a central processor 22, a main memory 24, a frame buffer 26, and a small predictive cache memory 28. Each of the elements is connected to the system bus. The cache memory 28 is placed at the bus interface so that it can acknowledge the existence of addressed information without the necessity of accessing the frame buffer 28. The arrangement of FIG. 3 is adapted to be controlled by system software so that any access of the frame buffer 26 by the central processor 22 causes the information accessed and its address to be placed in the central position of the appropriate nine pixel positions of the cache 28. Then the information stored in the eight addresses of the frame buffer 26 surrounding the accessed position are placed with their addresses in the other eight positions of the cache memory 28. In general, this filling requires three or four accesses of the frame buffer. Although this filling of the cache 28 takes some time, the overall system latency usually provides sufficient time for the fill to be accomplished between frame buffer accesses. If the operation is such that information is to be written to another position of the frame buffer 26, the address of that position is determined and placed in the center of the second group of nine memory spaces in the cache memory 28. From that point on, the information regarding that line segment will be available for access in the cache 28. On the next access of an adjoining pixel, the information and address of that adjoining pixel is placed in the central position of the first group of nine pixels and the other positions are filled from the addresses surrounding that adjoining pixel, many of which are already in the cache. In like manner, the information for the new position is moved to the center of the second nine pixels as each pixel is written. A cache memory 28 designed in accordance with this philosophy provides the highest hit rate for such a small predictive cache in rendering connected line segments to a frame buffer.

Another arrangement for implementing a predictive cache in accordance with this invention makes use of a somewhat different caching arrangement than one which surrounds the possible positions to which the next access might be directed. Such an arrangement is less expensive because it uses less hardware but will probably have a somewhat lower hit rate. The arrangement is less expensive in hardware cost because it attempts to predict only a single position for a next access of the frame buffer rather than storing information for all possible positions surrounding a first accessed position.

Figure 4:
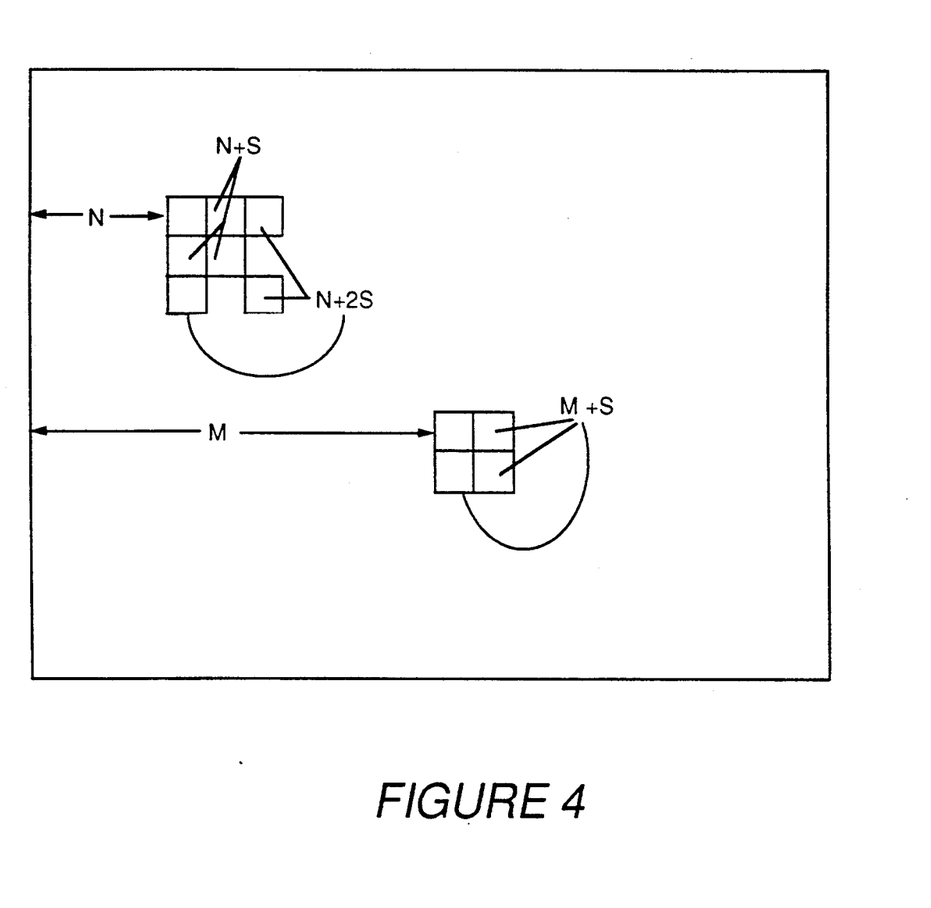
FIG. 4 is an illustration of a portion of a frame buffer useful in understanding the operation of this invention.

Such an arrangement may be arrived at by reviewing in more detail the various operations which may occur in a frame buffer. These operations may be broken into specific steps which are illustrated in FIG. 4. For example, a series of read operations may occur to determine a line position. In such operations, an address N may be read, then an address N+S where S is some offset from the address N usually within one pixel of the initial pixel. The offset S may be referred to as the stride. Within any particular line segment, the next pixel to be accessed probably lies at N+2S, whatever the direction of the line segment. The same pixel accesses occur for a sequence of write raster operations. Given the first address and the stride, the next pixels in a sequence of read or write accesses are fairly predictable so long as a single straight line segment is being accessed. It is possible, of course, that the shape of a line segment will vary so much from the few pixels that prediction is not possible; and this fact lowers the hit rate somewhat. For operations involving only writing a line segment to the frame buffer, the same sequences of operations occur as in a read operation.

For operations involving copying pixels of a line segment from one position to another position such as in scrolling and similar operations, more is involved. Memory, including frame buffers, is almost always accessed in amounts larger than a pixel. For example, a typical system accesses an entire word in memory. Such a word may include thirty-two bits or four bytes of memory. In a black and white system in which each pixel is defined by a single bit, thirty-two different pixels are included within each word. Most systems do not allow access of individual pixels; usually a byte (eight pixels in the exemplary system) is the least amount which may be accessed. Thus, a byte or an entire word must be accessed in order to copy even a single pixel from one place to another in the frame buffer. If the byte including the pixel of interest lies at the same offset from the beginning of a word to be read as it does in the word to be written, then a copy operation involves only a read and a write insofar as addresses are concerned. That is, a read at position N is written to position M; a next read at position N+S is written to position M+S. This sequence continues as the line is read and written. Such a read will access and store, in addition to the pixel of interest, adjacent pixels within the same byte or word lying in the same row; if these pixels contain additional line segment positions, they are accessed within the single access of the first position.

However, if the first pixel to be read lies at a first offset from a word boundary in the frame buffer (where additional pixels to be read lie in the same row) and that first pixel is to be written to a position which lies at a second offset from a word boundary, either the portion to be accessed or the portion to be written may lie in two different words or bytes. Copying this information may be accomplished in one of two ways, either two read operations and one write, or one read and two writes. In one case you need to do enough reads (two) to be able to entirely satisfy a write of an entire word. In the other case you need to do up to two writes to entirely utilize a whole word from each read. In most computers the read/read/write process is used, and this type of copy operation then continues as read/write/read/write. Some copy operations even have a pattern of $R_S/R_D/W_D$, $R_S/R_D/W_D$, etc., the second read being required by the raster operation specified for merging new data (S subscript for source data) with old (D subscript for destination data).

Thus, it can be seen that for any of the typical frame buffer operations, a pattern of read/read/read, write/write/write, or read/write/read/write may be discerned. Knowing this, pattern recognition circuitry may be provided from which the next access can be predicted. For example, if the address of the present information access is desired, its position may be predicted from the last three accesses to the frame buffer. Thus, in general, the last three addresses, the data from the last two accesses, and the type of access (read or write) will predict the next position of a pixel. The type of access defines the pattern as READ/READ/READ, WRITE/WRITE/WRITE, or READ/WRITE/READ/WRITE. Moreover the difference in the addresses predicts the stride for the desired access. As pointed out above, the stride for the READ/READ/READ and WRITE/WRITE/WRITE is the difference between the last and the next to last access addresses. In the case of a copy type of operation in which the pattern is READ/WRITE/READ/WRITE, the stride between the two read accesses is the same as the stride between the write accesses and the stride between a read and a write access is the same as the last stride between a read and a write access. Consequently, wherever in the pattern for any particular line segment accesses are compared after the first three pixels of a copy or similar operation, the next access is predictable. And even more complex repeating patterns may be made predictable with sufficient logic.

Figure 5:
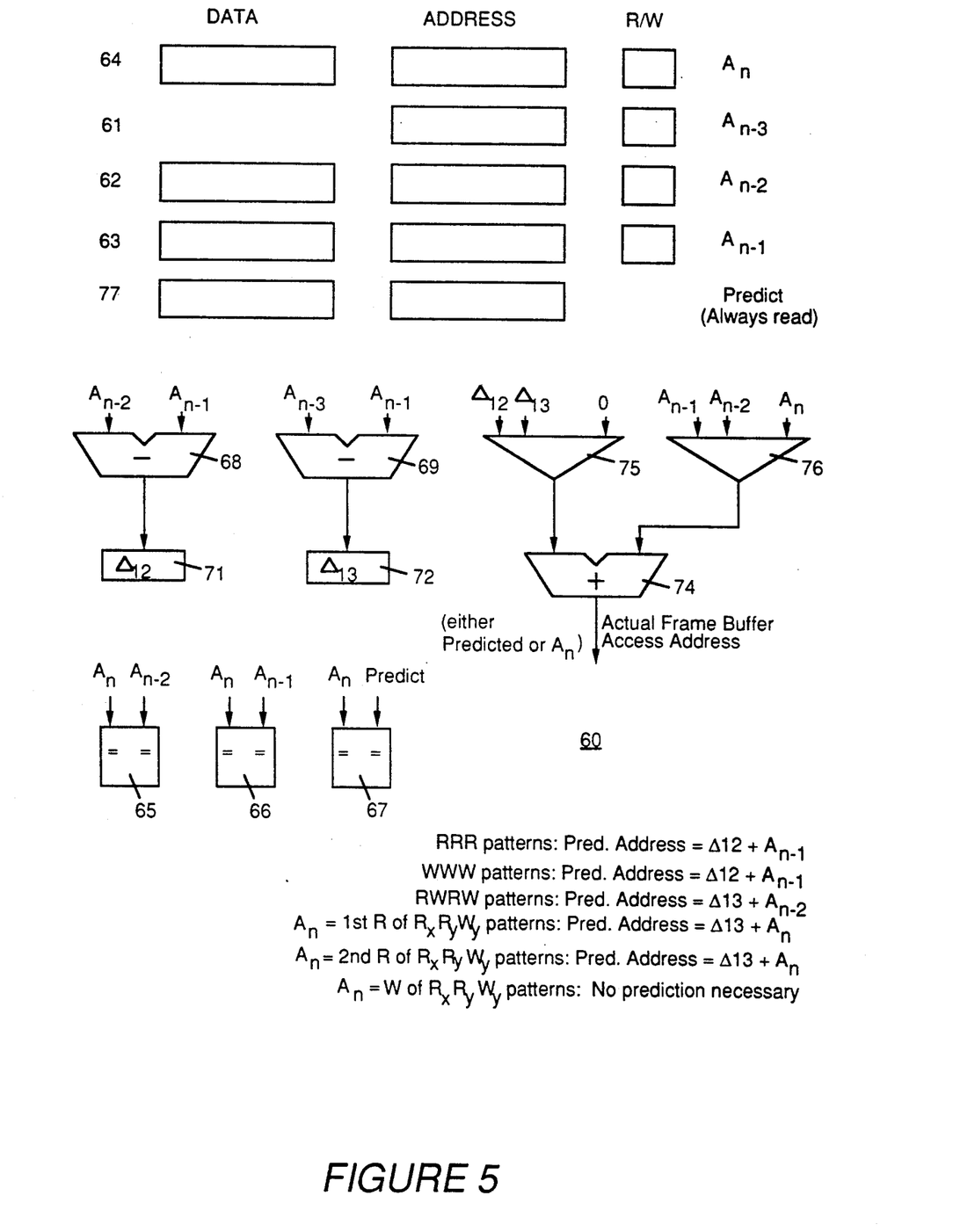
FIG. 5 is a block diagram illustrating a second circuit for accomplishing caching in accordance with the invention.

FIG. 5 illustrates in block diagram form circuitry 60 which may be utilized to accomplish this more specific form of predictive caching. The circuitry 60 includes registers 61-63 for storing the addresses of each of the last three accesses, the data associated with the last two accesses (usually data is not useful more than two steps back), and the access type of each of the last three accesses. It is desired to predict and place in the cache the data which is to be accessed at the next step so that an access of the frame buffer is not necessary. The incoming address, data, and operand from the central processor is furnished to a register 64 for comparison with the addresses in the cache.

The addresses of the last three accesses in registers 61-63 are compared in comparators 65-67 to determine if there is a cache hit. For prediction, the address information in these registers is selectively furnished in response to the access pattern determined to subtractors 68 and 69 for determining the stride between read or write accesses depending upon the pattern determined by the comparators. The stride plus the address of one of the last accesses furnishes the predicted address from which information is to be accessed. The information at this address in the frame buffer is accessed and placed in the cache (77) so that it is available when a new address is received from the central processing unit.

More particularly, if the type of access is found to be of the READ/WRITE/READ/WRITE TYPE, then a copy type operation is predicted. In such a case, the last address $A_{n-1}$ is subtracted from the previous address $A_{n-2}$ to provide the difference between the positions of the read and the write operation. This result is stored in a register 71. The difference between the addresses $A_{n-3}$ and $A_{n-1}$ is then determined in subtractor 69 to provide the difference between the last two read operations or the last two write operations, and the result is placed in a register 72. The results in the two registers 71 and 72 are selected by a multiplexor 75 and added to an access address selected by the multiplexor 76 by an adder 74, and the result is the address predicted. This predicted access's data is placed in the register 77 to be accessed by the central processor. This second, more specialized caching arrangement has a significantly lower miss penalty (one access) than the first arrangement (average of three accesses).

It should be noted that the use of these small specialized caches does not affect in any way the operation of the computer system other than to speed its operation. The predictive cache memory stores information in parallel with the other operations of the system so that the fact that a particular prediction does not turn out to be valid does not delay the system; the operation simply proceeds in its normal manner in the case of a cache miss.

Although the use of predictive caching has been described with respect to frame buffers which have very formal patterns of operation, many of the same characteristics may be found in random access memory. Consequently, the same general principles may be applied to operations within random access memory. For example, there are many situations in which information is stored in or derived from a matrix stored in main memory or is involved in a looping operation. These same principles can be applied to this sort of operation. Memory operations having discernable patterns which may be treated in a similar manner will occur to those skilled in the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer system comprising a central processing unit (CPU), a main memory, a frame buffer and a cache memory coupled to said frame buffer, a computer implemented method for generating a predicted address for said frame buffer comprising the steps of:

storing, in a plurality of address registers, three addresses for said three previous accesses to said main memory such that a first address designates a first previous access to said main memory, a second address designates a second previous access to said main memory and a third address designates a third previous access to said main memory;

storing, in a plurality of access type registers, three access types for said three previous accesses to said main memory wherein each access type specifies either a read or a write operation to said main memory such that a first access type specifies a read or write operation of said first previous access, said second access type specifies a read or write operation of said second previous access and a third access type specifies a read or write operation of said third previous access;

ordering, in a sequence, said first, second and third access types so as to generate an operation pattern;

calculating a stride from said three addresses based on said operation pattern;

selecting said third address when said operation pattern comprises a read, read, read (RRR) or write, write, write (WWW) pattern;

selecting said second address when said operation pattern comprises a write, read, write (WRW) pattern;

generating said predicted address by adding said stride calculated for said operation pattern to said address selected;

reading data in said main memory at said predicted address; and storing said data in said cache memory.

2. The computer implemented method for generating a predicted address as claimed in claim 1 wherein the step of calculating a stride based on said operation type comprises the steps of:

subtracting said first address from said second address to generate a first stride when said operation pattern comprises a read, read, read (RRR) or write, write, write (WWW) pattern; and subtracting said third address from said first address to generate a second stride when said operation pattern comprises write, read, write (WRW) or read, read, write (RRW) pattern.

3. In a computer system comprising a central processing unit, a main memory, a frame buffer and a cache memory coupled to said frame buffer, a computer implemented method for generating a predicted address for said frame buffer comprising the steps of:

storing, in a plurality of address registers, three addresses for said three previous accesses to said main memory such that a first address designates a first previous access to said main memory, a second address designates a second previous access to said main memory and a third address designates a third previous access to said main memory;

storing, in a plurality of access type registers, three access types for said three previous accesses to said main memory wherein each access type specifies either a read or a write operation to said main memory such that a first access type specifies a read or write operation of said first previous access, said second access type specifies a read or write operation of said second previous access and a third access type specifies a read or write operation of said third previous access;

ordering, in a sequence, said first, second and third access types so as to generate an operation pattern;

subtracting said first address from said second address to generate a first stride when said operation pattern comprises a read, read, read (RRR) or write, write, write (WWW) pattern;

subtracting said third address from said first address to generate a second stride when said operation pattern comprises write, read, write (WRW) or read, read, write (RRW) pattern;

selecting said third address when said operation pattern comprises a read, read, read (RRR) or write, write, write (WWW) pattern;

selecting said second address when said operation pattern comprises a write, read, write (WRW) pattern; and generating said predicted address by adding said stride calculated for said operation pattern to said address selected;

reading data in said main memory at said predicted address; and storing said data in said cache memory.

4. In a computer system comprising a central processing unit (CPU), a main memory, a frame buffer and a cache memory coupled to said frame buffer, an apparatus for generating a predicted address for said frame buffer comprising:

storage means for storing a plurality of addresses and access types, said storage means storing three addresses for said three previous accesses to said main memory such that a first address stored designates a first previous access to said main memory, a second address stored designates a second previous access to said main memory and a third address stored designates a third previous access to said main memory, and said storage means storing three access types for each of said three previous accesses to said main memory specifying either a read or a write operation to said main memory such that a first access type specifies a read or write operation of said first previous access, said second access type specifies a read or write operation of said second previous access and a third access type specifies a read or write operation of said third previous access;

prediction means coupled to said storage means for predicting an address for a subsequent write operation to said frame buffer, said prediction means ordering, in a sequence, said first, second and third access types so as to generate an operation pattern, and calculating a stride from said three addresses based on said operation pattern, and selecting said third address when said operation pattern comprises a read, read, read (RRR) or write, write, write (WWW) pattern, and selecting said second address when said operation pattern comprises a write, read, write (WRW) pattern, said prediction means generating said predicted address by adding said stride calculated for said operation pattern to said address selected; and fetching means coupled to said prediction means for writing data from said main memory to said cache memory, said fetching means reading data in said main memory at said predicted address, and storing said data in said cache memory.

5. The apparatus for generating a predicted address as set forth in claim 4 wherein said prediction means comprises a calculation means for calculating said stride, said calculation means comprising:

said calculation means subtracting said first address from said second address to generate a first stride when said operation pattern comprises a read, read, read (RRR) or write, write, write (WWW) pattern; and said calculation means subtracting said third address from said first address to generate a second stride when said operation pattern comprises write, read, write (WRW) or read, read, write (RRW) pattern.

* * * * *

UNITED STATES PATENT AND TRADEMARK OFFICE
CERTIFICATE OF CORRECTION

PATENT NO. : 5,287,487
DATED : February 15, 1994
INVENTOR(S) : Priem et al.

It is certified that error appears in the above-identified patent and that said Letters Patent is hereby corrected as shown below:

In column 10, claim 3 at line 42, please delete " unit, " and insert -- unit (CPU), --.

Signed and Sealed this

Twenty-seventh Day of January, 1998

Attest:

BRUCE LEHMAN

Attesting Officer

Commissioner of Patents and Trademarks